Oct. 7, 1941.  E. MARTIN  2,258,462
ELECTRIC SYNCHRONIZER
Filed Feb. 26, 1938 2 Sheets-Sheet 1
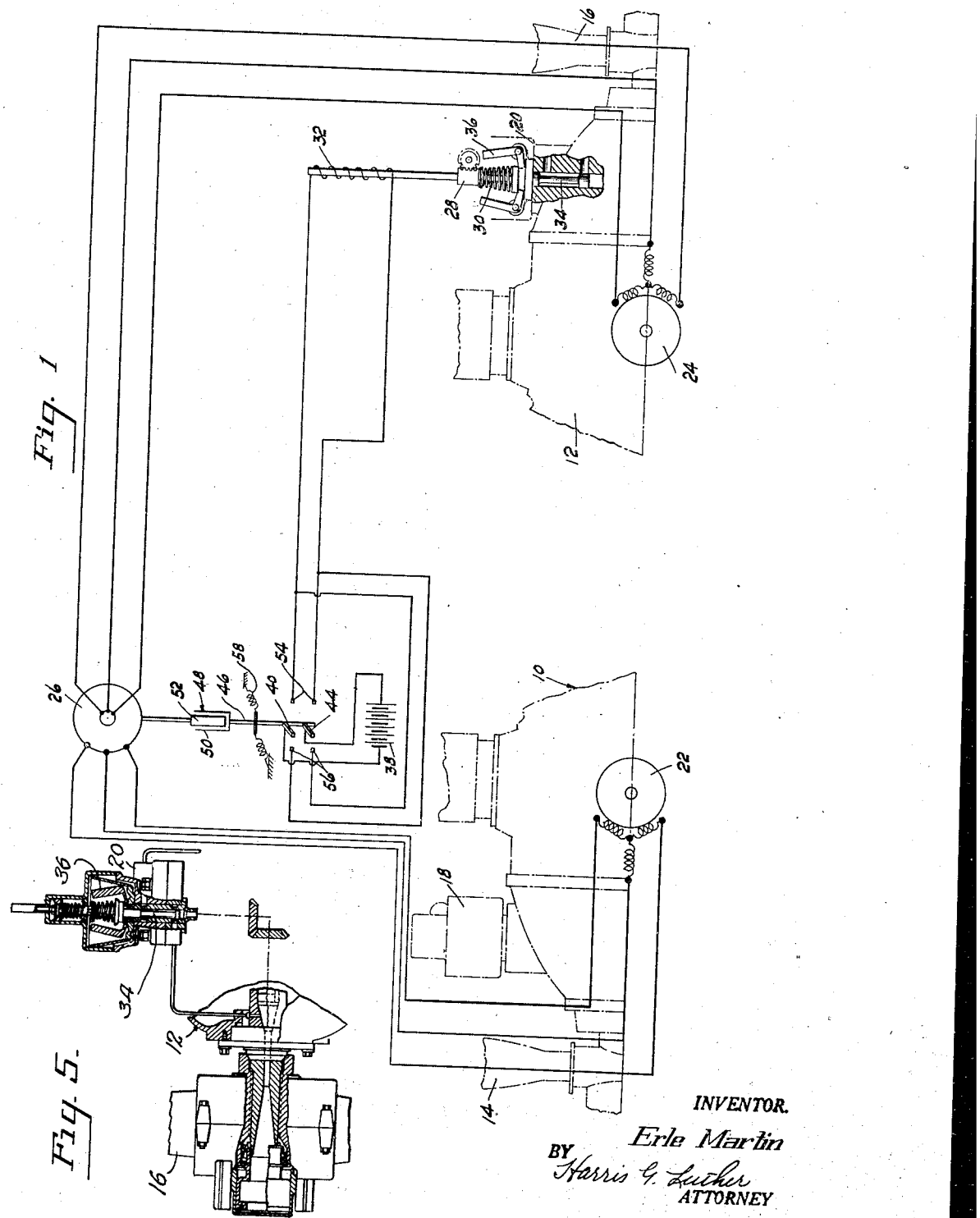
INVENTOR.
Erle Martin
BY Harris G. Luther
ATTORNEY Oct. 7, 1941.   E. MARTIN   2,258,462
ELECTRIC SYNCHRONIZER
Filed Feb. 26, 1938   2 Sheets-Sheet 2
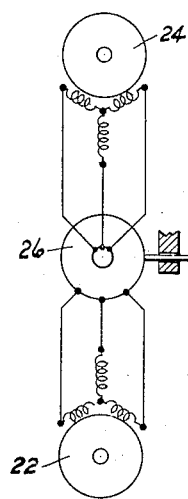
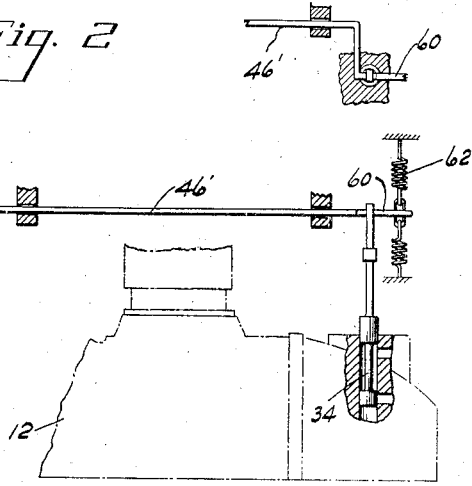
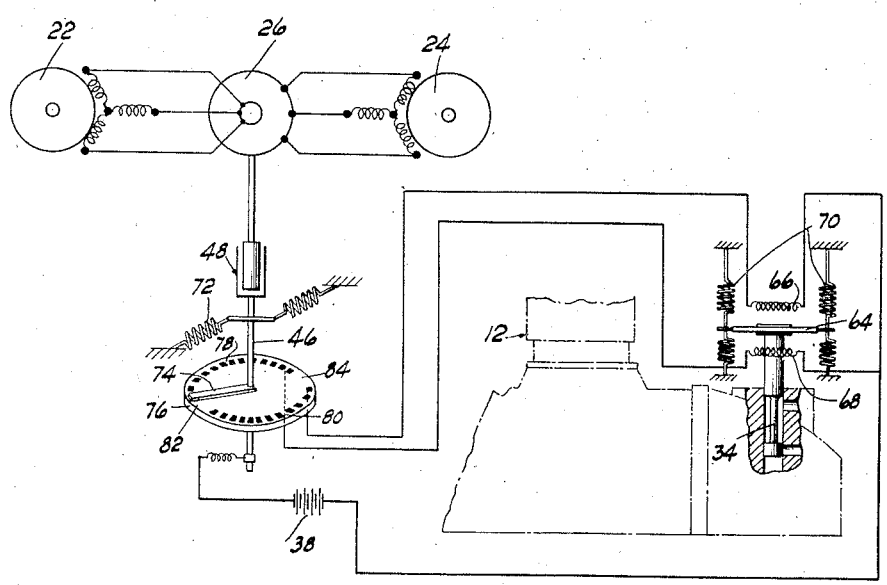
INVENTOR.
Erle Martin
BY Harris G. Luther
ATTORNEY of the reduction in the length of the corresponding resistance 78 or 80. Thus when the controlled motor has a speed out of synchronism with that of the master motor, the proper electro magnet 66 or 68 will be energized to a degree depending upon the extent of the out of phase condition and will apply a force against the resilient action of the balance spring 70 to move the valve 34 and change the pitch of the corresponding propeller 16 to thereby change the load on the controlled engine and bring that engine back to a condition of speed synchronization with the master engine or reference speed.

In general, the method of utilizing the improved synchronizing apparatus, is to electrically compare the speed of the controlled motor with that of the master motor by applying the output of individual alternating current generators driven by the respective engines to an electrical differential mechanism, such as a motor having relatively rotatable portions separately energized by the respective alternating current generators and to then apply the reaction of the differential motor to a speed controlling device of the controlled engine. In the form of the invention illustrated in Figs. 1 and 4 the reaction of the differential motor is electrically applied to the pitch controlling valve by means of reversible electro magnetic means controlled by a reversing switch actuated by the differential motor. In the form shown in Fig. 2 the reaction of the differential motor is directly applied to the propeller pitch controlling valve of the controlled engine, in all cases a magnetic torque transmission device acting against a resilient centering device being inserted between the differential motor and the engine speed control so that the differential motor may overrun the speed control mechanism if the out of phase condition continues for a sufficient period.

In all applications of the apparatus of the invention the speed of the controlled motor is electrically compared with the speed of the master motor or reference speed device by means of an electrical differential mechanism having parts which are relatively rotatable when subjected to respective alternating currents which are out of phase with respect to each other, and this relative rotation is utilized to actuate electrically energized devices operative to change the speed of the controlled motor or motors.

In case more than one motor is to be controlled the master motor or reference speed device may be connected with an individual differential motor for each controlled motor or engine and the speed of each controlled engine thus compared with the speed of the master or reference speed and brought into synchronism therewith.

While there has been illustrated and described by way of example three slightly modified forms of my improved synchronizing apparatus, it is to be understood that the invention is in no way limited to the particular forms so illustrated and described but that such changes in the various elements and in the arrangement and combination of elements may be resorted as come within the scope of the appended claims.

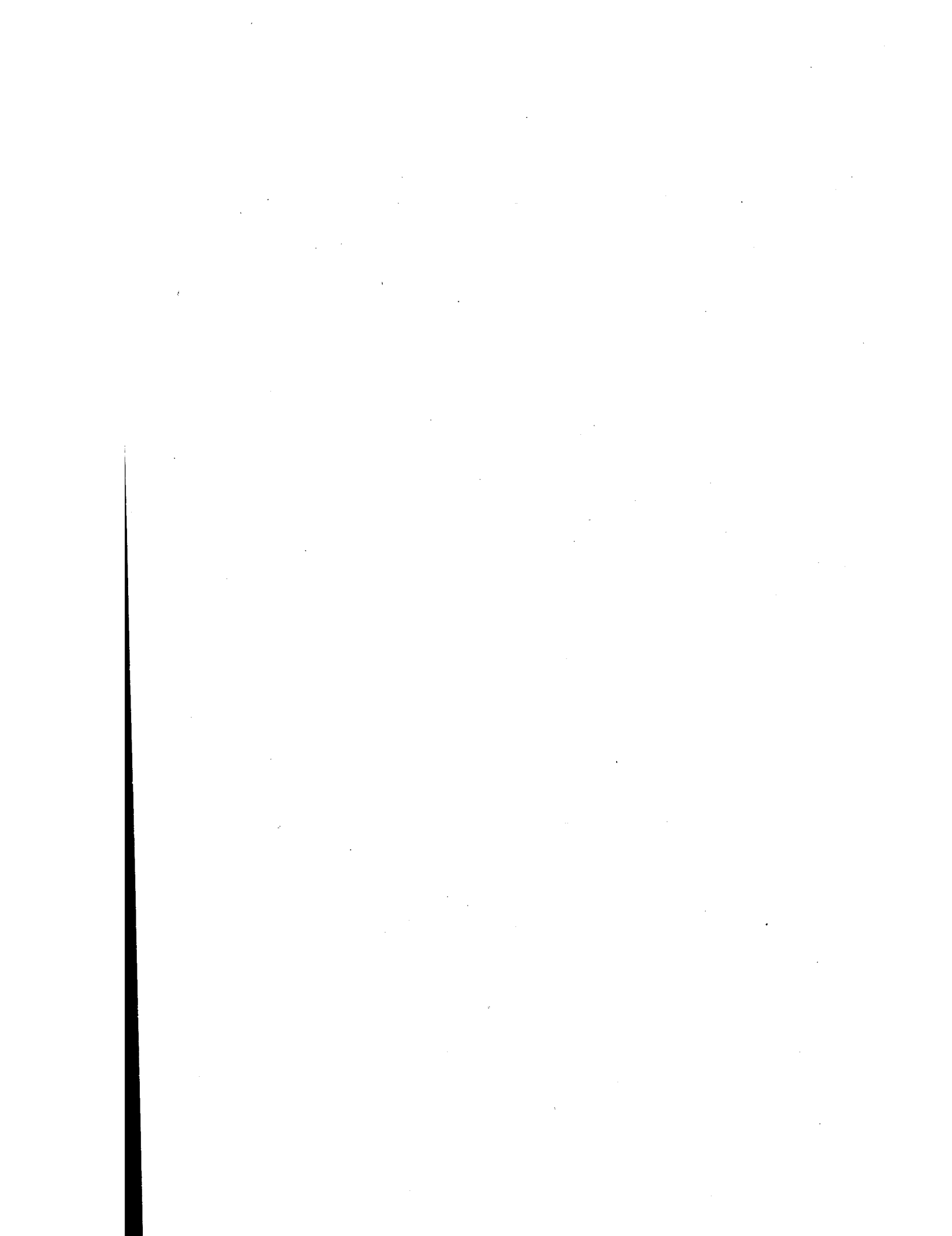

Having now described the invention so that others skilled in the art may clearly understand the same what it is desired to secure by Letters Patent is as follows:

1. Apparatus for synchronizing the speeds of cooperating powerplants each having an individual speed controlling means comprising, a hydraulic motor for operating at least one of said speed controlling means, a valve for controlling said motor having a neutral position in which it blocks said motor and renders said speed controlling means inoperative to change the speed of the associated engine, means resiliently urging said valve to its neutral position, a speed difference responsive means having an element rotatable at a speed in direct proportion to the magnitude of the difference between the speed of the engine having said hydraulically adjusted speed controlling means and another engine or reference speed device, and means including a torque coupling between said rotatable element and said valve for urging said valve away from its neutral position with a force proportional to the speed of said rotatable element.

2. Apparatus for synchronizing the speed of a power unit with a reference speed comprising, an electromotive device for changing the operating conditions of said powerplant to control the speed thereof, said electromotive device having a neutral position in which it is ineffective to change the operating conditions of said power unit, means resiliently urging said electromotive device to its neutral position, means for energizing said electromotive device to move in one direction or the other from said neutral position, a speed difference responsive differential device having a movable element driven at a speed proportional to the variations of the speed of said power unit from said reference speed, and a variable torque coupling between said rotatable element and said energizing means for actuating said energizing means to energize said electromotive device to move in one direction or the other depending on the direction of rotation of said movable element.

3. Apparatus for synchronizing the speed of a power unit with a reference speed comprising, speed controlling means operatively associated with said power unit, means for energizing said speed controlling means, said energizing means having a neutral position in which said speed controlling means is rendered ineffective to change the speed of said power unit, resilient means urging said energizing means to its neutral position, speed difference responsive differential means having a portion driven at said reference speed and a portion driven by said power unit and a rotatable element driven at a speed directly proportional to the magnitude of the variation of the speed of said power unit from said reference speed, and a torque coupling between said rotatable unit and said energizing means operative to move said energizing means away from its neutral position with a force proportional to the speed of said rotatable element.

4. Apparatus for synchronizing the speed of a power unit with a reference speed comprising, an electromotive device for changing the operating conditions of said power unit to control the speed thereof, a variable function device for controlling the energization of said electromotive device, said variable function device having a neutral position in which said electromotive device is rendered ineffective to vary the operating conditions of said power unit, means resiliently urging said variable function device to its neutral position, a speed difference responsive differential device having a rotatable element rotatable at a speed directly proportional to the variations of the speed of said power unit from said reference speed, and a variable torque coupling between said rotatable element and said variable function device operative to apply to said device a force proportional to the speed of said rotatable element to move said device from its neutral position.

5. Apparatus for synchronizing the speed of a power unit with a reference speed comprising, an electromotive device for changing the operating conditions of said power unit to control the speed thereof, a rheostat for controlling the energization of said electromotive device, said rheostat having a neutral position in which said electromotive device is rendered ineffective to vary the operating conditions of said power unit, means resiliently urging said rheostat to its neutral position, a speed difference responsive differential device having a rotatable element rotatable at a speed directly proportional to the variation of the speed of said power unit from said reference speed, and a variable torque coupling between said rotatable element and said rheostat operative to apply to said rheostat a force proportional to the speed of said rotatable element to move said rheostat from its neutral position.

6. Apparatus for synchronizing the speed of a power unit with a reference speed comprising, an electromotive device for changing the operating conditions of said power unit to control the speed thereof, a reversing switch for controlling the energization of said electromotive device, said reversing switch having a neutral position in which said electromotive device is rendered ineffective to vary the operating conditions of said power unit, means resiliently urging said reversing switch to its neutral position, a speed difference responsive differential device having a rotatable element rotatable at a speed directly proportional to the variation of the speed of said power unit from said reference speed, and a variable torque coupling between said rotatable element and said reversing switch operative to apply to said switch a force proportional to the speed of said rotatable element to move said switch from its neutral position.

7. Apparatus for synchronizing the propeller driving engines of a multi-engined aircraft comprising, a respective speed controlling motor for each engine, a valve for controlling each motor each valve having a neutral position in which it blocks the respective motor and maintains the associated engine at a substantially constant speed, resilient means for returning each valve to its neutral position, a speed difference responsive differential device having an element rotatable at a speed directly proportional to the magnitude of the speed difference between the engines of each pair constituted by one of said engines selected as a master engine and another engine synchronized therewith, an electro-magnetic device for modifying the action of one of said valves of each engine pair, and means actuated by the movable portion of the respective differential device for controlling the energization of said electromagnetic means.

ERLE MARTIN.

Oct. 7, 1941.  W. H. PAYNE  2,258,468
AUTOMATIC ELECTRIC ARC FURNACE ELECTRODE CONTROL
Filed May 20, 1940
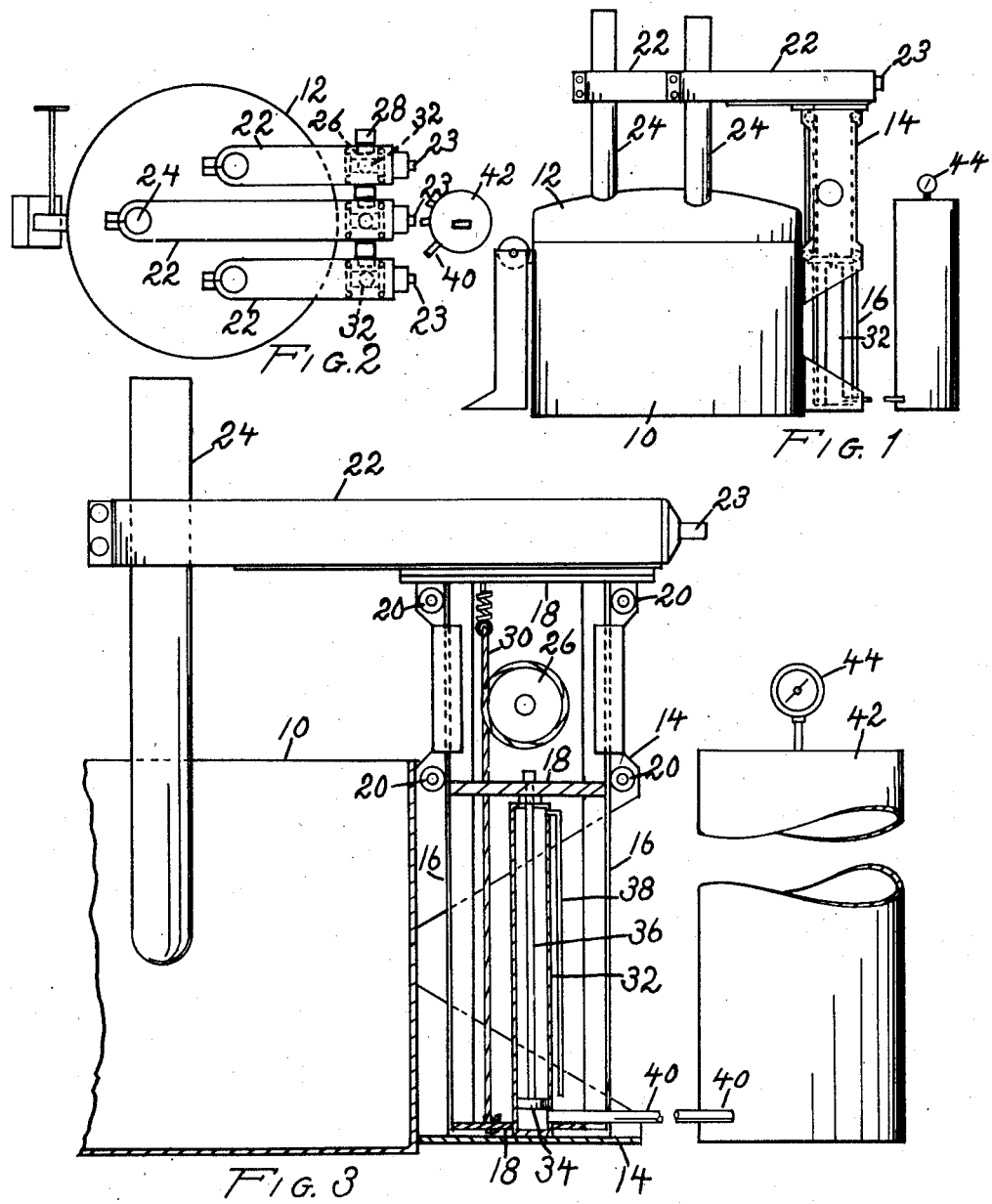
WILLIAM HARVEY PAYNE
INVENTOR.
BY Leon T. Hosier
ATTORNEY.